INVENTOR
ARTHUR J. RHODES
AND BERNARD H. RHODES
BY
Donald H. Sweet

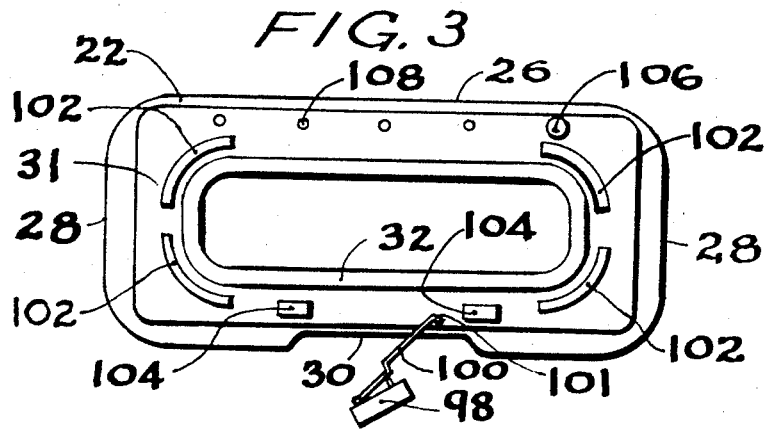
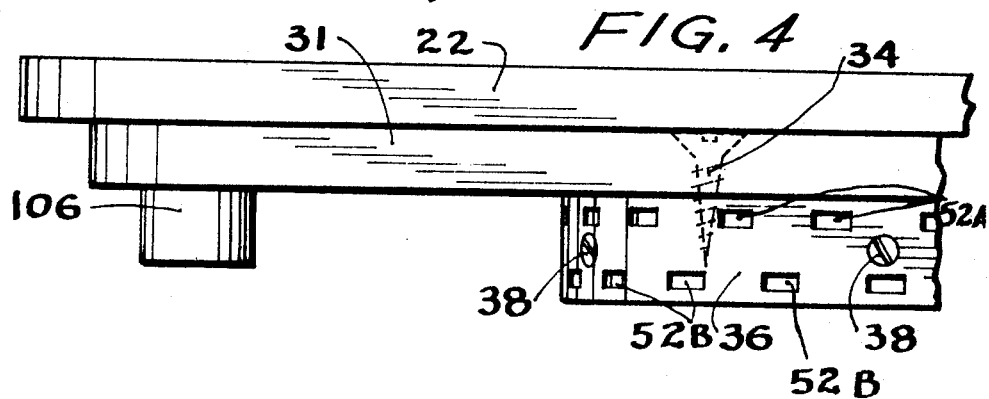
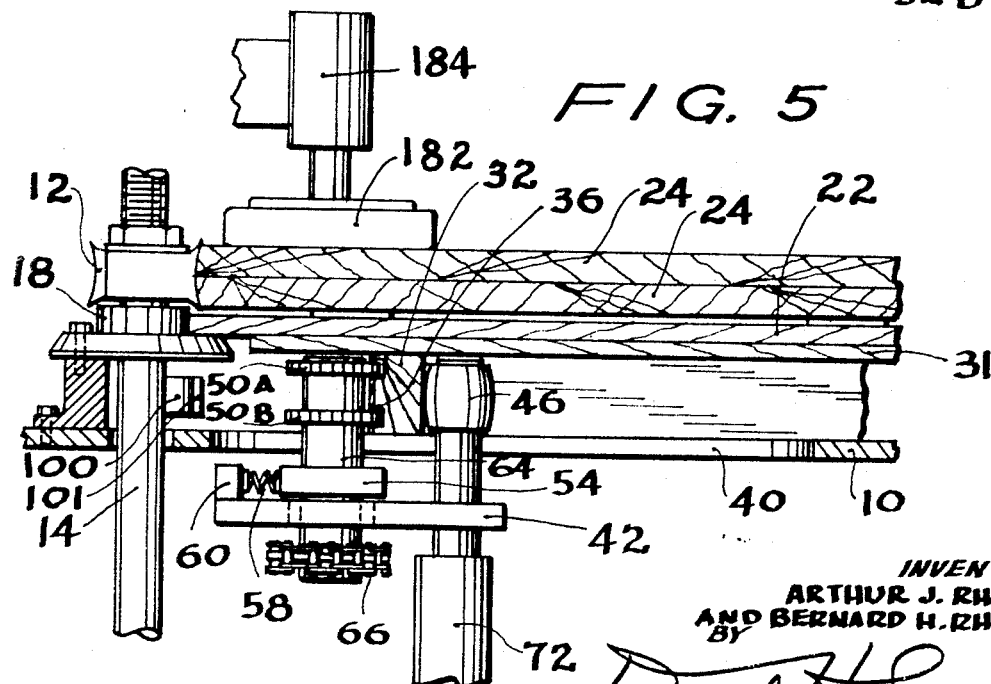

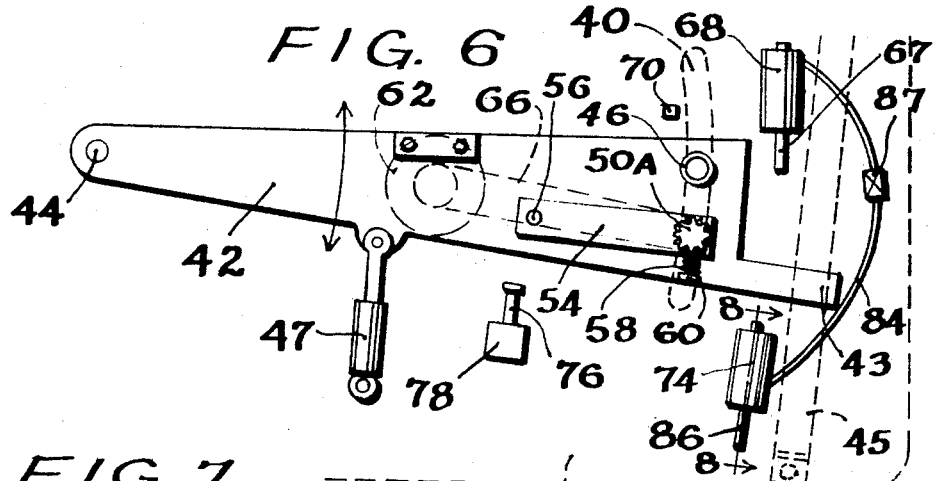
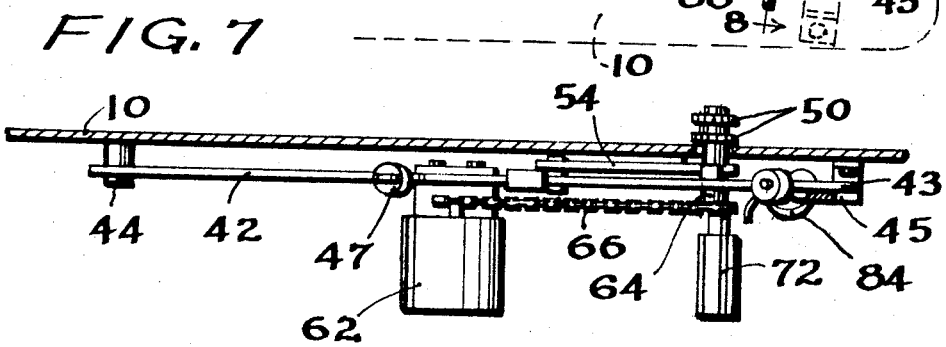
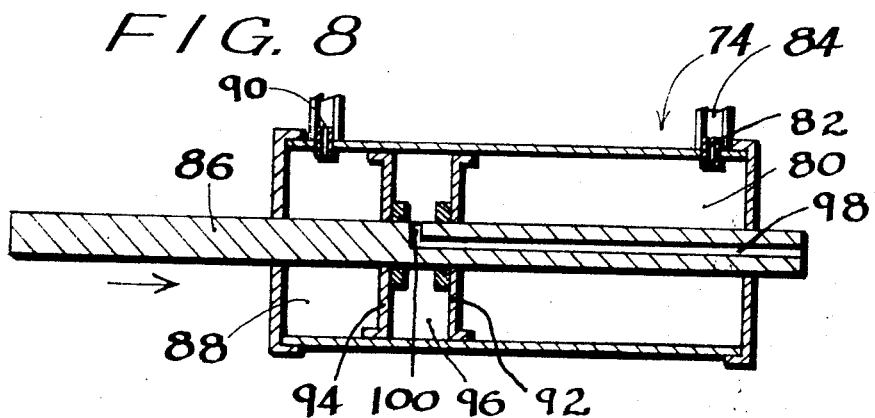

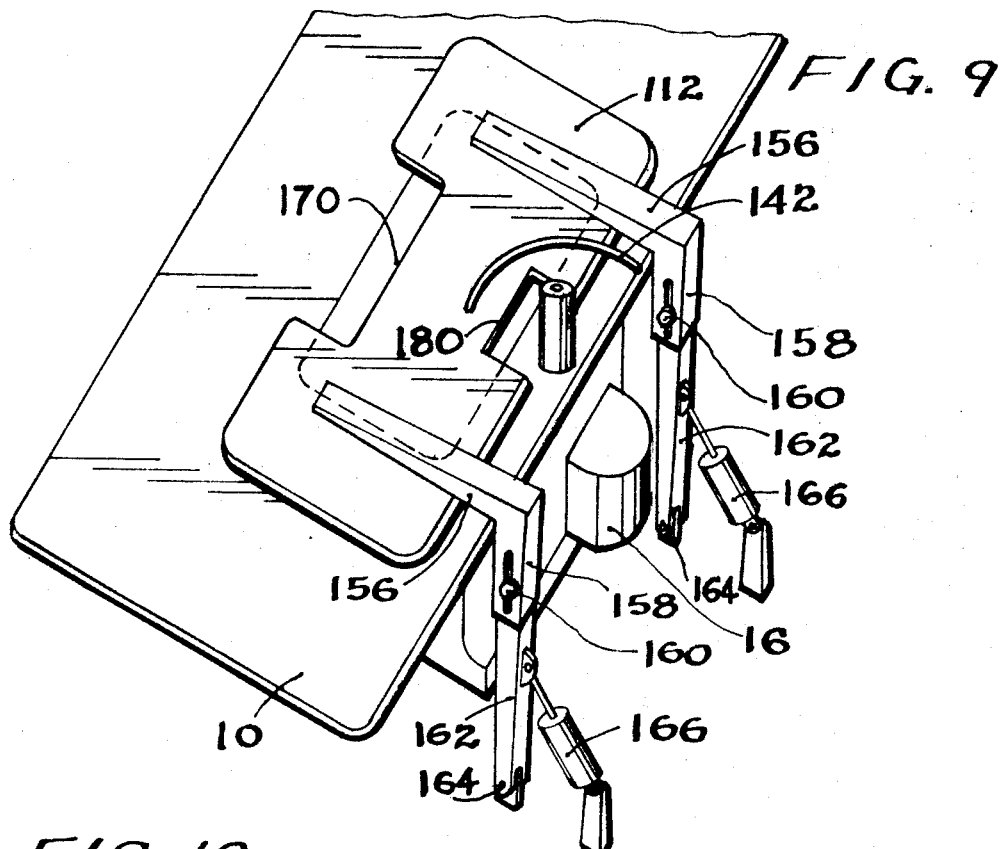
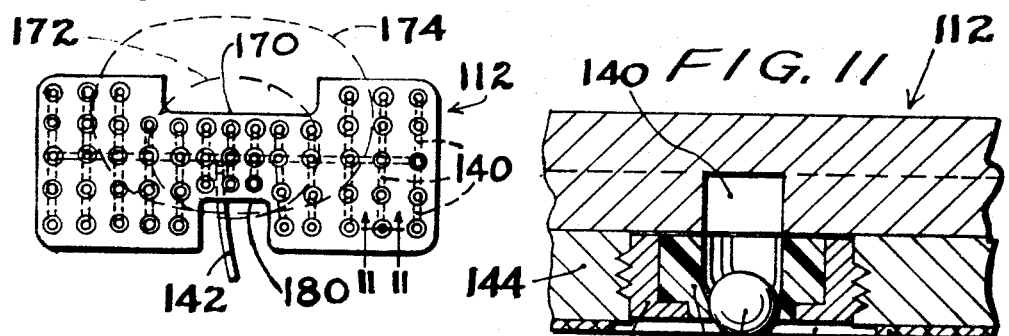
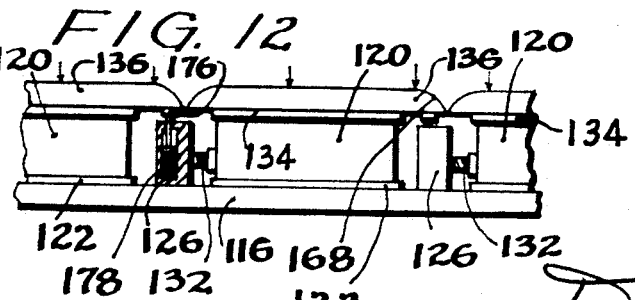

INVENTOR.
ARTHUR J. RHODES
BY AND BERNARD H RHODES

United States Patent Office 3,447,420
Patented June 3, 1969

3,447,420
AUTOMATIC SHAPER
Arthur J. Rhodes, 1509 N. Halsted St., Chicago, Ill. 60622, and Bernard H. Rhodes, Chicago, Ill.; said Bernard H. Rhodes assignor to Arthur J. Rhodes, Chicago, Ill.
Filed Aug. 11, 1966, Ser. No. 571,863
Int. Cl. B23c 1/18; B27c 5/02
U.S. Cl. 90—13.2                    19 Claims

ABSTRACT OF THE DISCLOSURE

A workpiece is mounted on a pallet, together with a pattern having a cam edge defining the contour for the finished piece. This rather heavy assembly is slidably supported on a smooth tabletop and need never be lifted by the operator. A conventional rotary cutting tool is mounted near one side of the table. Means are provided below the table for moving the workpiece in the path determined by its pattern, to generate the finished contour.

The pallet carries a downwardly extending peripheral flange and a carriage below the tabletop carries feed means including a pressure element and a feed element extending up to engage opposite faces of said flange. The feed element has gear teeth for positive driving engagement with cooperating recesses on the flange, and the pressure element may be a roller, spring-pressed toward the gear teeth and engaging the other side of the flange. The carriage and all the feed means are movably guided as a unit, and yieldingly urged toward the cutting tool with force enough to hold the cutter into the work. Excess force merely maintains a steady pressure of the work pattern against a rotatable collar coaxial with the cutting tool.

The element engaging the inner face of the pallet flange can be withdrawn below the table to release the pallet carrying the finished piece so that it can slide away and make way for another pallet carrying an unfinished workpiece.

To get maximum efficiency in the use of the cutter, the pallet carries additional cams to actuate electrical controls and vary the speed of the cutter at a variety of different speeds, depending on the depth of the cut taken by the cutter at different points along the periphery of the workpiece.

---

Our invention relates to the problem of producing duplicate parts of irregular shapes, such, for instance, as tabletops with irregular contours. When such a product is of such permanently standardized design that it will be produced year after year with no changes whatsoever, it is obvious that an automatic machine can be made to perform the entire operation, but such a completely automatic machine becomes useless and needs to be rebuilt in case the product is changed. Conditions in the manufacturing of durable consumer goods of various materials, such as wood, plastic, and metal, are such that no such products have the degree of permanence compatible with the design of such completely special machinery, so far as we are aware.

An important objective of the invention is to provide equipment in which runs of from 5,000 to 500,000 or so pieces can be produced expeditiously on a semi-automated basis. One important objection to machines of this type with which we have had previous experience is the necessity for having the operator lift the work in transferring it from one place to another, because the workpiece itself, together with clamping equipment for holding it, makes a heavy assembly and imposes a substantial burden on the operator if it must be lifted in moving it around.

Another object of the invention is to reduce power consumption and wear on the operating parts in connection with traversing a workpiece past a shaping tool. To the best of our knowledge, it has been universal in the past to have the workpiece lie below a polished stationary pressure element yieldingly but with great force to withstand the extreme vibration incident to operation of a shaping tool. Even with carefully polished and smooth pressure surfaces, the friction load imposed on the feed means is a material loss of power and the friction elements are subject to severe wear.

Elimination of most or all such friction engagement is particularly advantageous when the support means or pallet, carrying the working pieces, carries a multiplicity of workpieces past the tool one after the other, so that finished workpieces pass to points remote from the tool where an operator can remove them from the pallet, or holder, and replace them with new pieces to be fashioned.

In the accompanying drawings:

FIGURE 3 is a partly diagrammatic bottom plan view of the pallet;

FIGURE 4 is a side elevation on a larger scale of a portion of the pallet of FIGURE 3;

FIGURE 5 is a vertical section in a plane passing through the axis of the pressure roller and drive pinion and shaping tool;

FIGURE 6 is a fragmentary plan view of the mechanism for activating the workpiece during the shaping operation;

FIGURE 7 is an elevation of the moving parts illustrated in FIGURE 6;

FIGURE 8 is a detail section as on line 8—8 of FIGURE 6;

FIGURE 9 is a perspective view of equipment for processing piece parts with a plurality of parts carried by a single pallet;

FIGURE 10 is a small scale plan view of part of the hold-down plate of FIGURE 9;

FIGURE 11 is a detail section on line 11—11 of FIGURE 10;

FIGURE 12 is a fragmentary elevation of the part of FIGURE 13 on a smaller scale;

Figure 1:
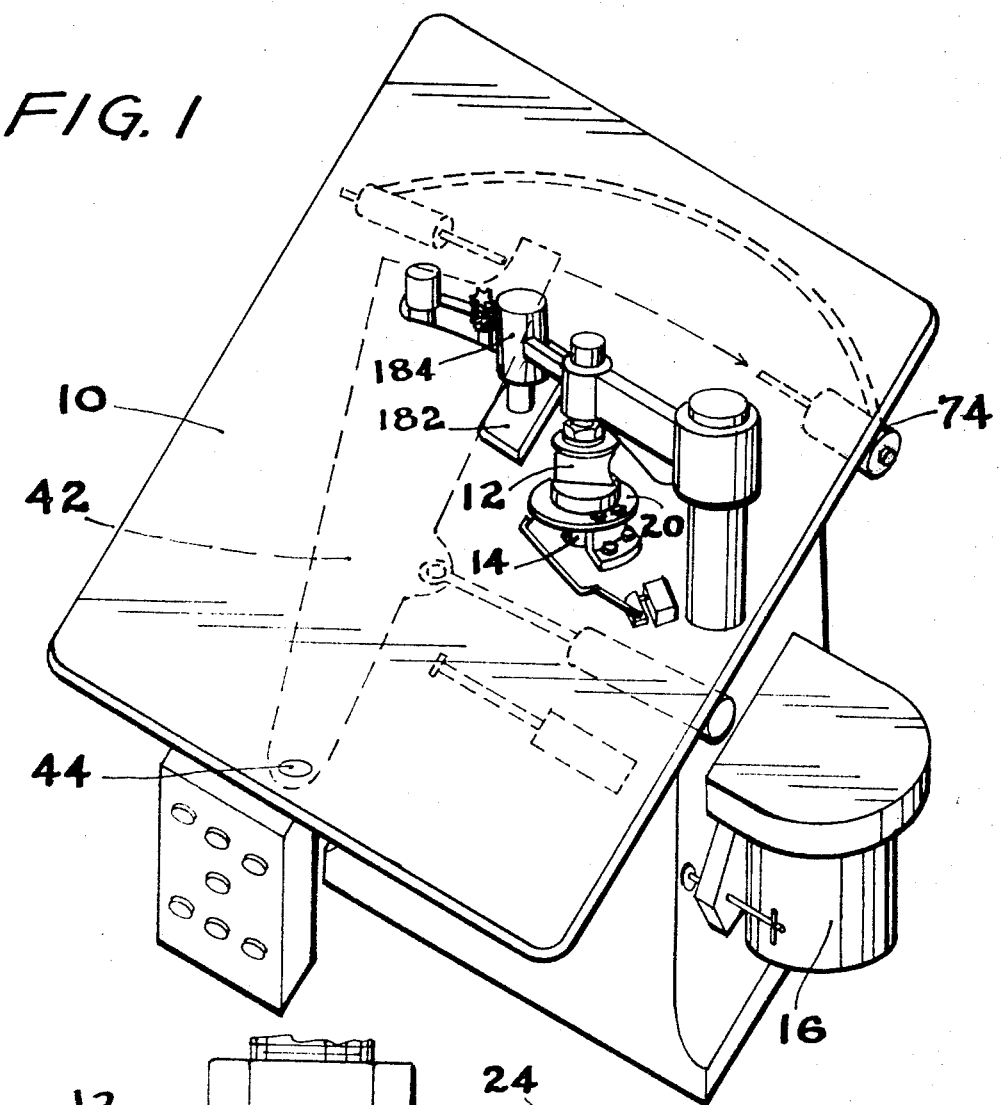
FIGURE 1 is a perspective and partly diagrammatic view of the novel portion of a production unit embodying the principles of our invention.
Figure 2:
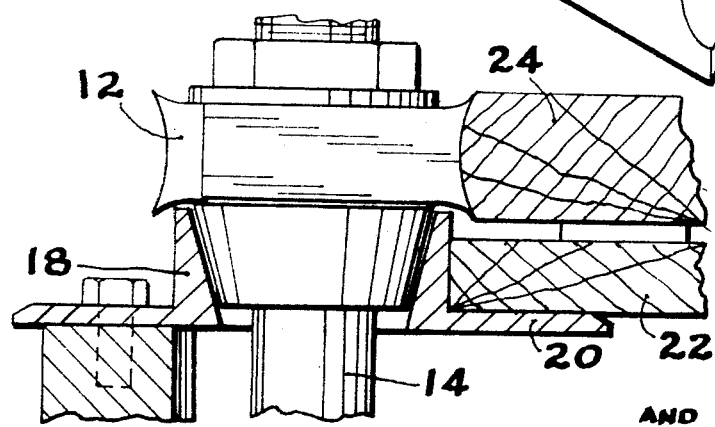
FIGURE 2 is a detail section through the vertical axis of the shaping tool.

In the embodiment of the invention selected for illustration, the working area is the top of a large horizontal table 10 with a smooth top surface on which objects can slide around with complete freedom of movement by rotation or translation or both. A conventional rotary shaping tool 12 is mounted for rotation on a vertical axis on a drive shaft 14 which is energized by a conventional motor in a housing 16.

Close below the cutter we provide a stationary abutment 18 of cylindrical form, coaxial with the shaft 14, with a bottom flange 20 extending out to underlie the edge of a template 22, which carries the pattern and, by bearing against the abutment 18, determines the movement of a workpiece or pieces 24 toward and away from the shaping tool, as rotation of the entire template and workpiece carries the operative edge of the template in sliding motion past the abutment 18 to expose, successively, the entire periphery of the workpiece to the action of the shaping tool.

Referring now to FIGURES 3, 4, and 5 the template 22 and workpieces 24 are illustrated as having a contour in the general shape of a rectangular parallelogram with one straight side at 26 and straight ends at 28 and a shallow offset inward at 30 in the other long side. The corners of the rectangle are rounded off.

Supporting the template 22 is a pallet 31, and to the bottom of the pallet we affix a track 32 by suitable means such as wood screws 34 (see FIGURE 4). This track is illustrated as of wood with an exterior sheet metal face plate 36, affixed as by screws 38.

This downwardly extending flange or track need not have a contour correlated with the contour of the workpiece 24 to be produced, or to the contour of the template 22. The configuration illustrated in FIGURE 3 functions equally well in shaping a workpiece of almost any contour because the abutment between the template 22 and the abutment 18 in the sole determinant of the approach of the work to the shaping tool 12, and it is only necessary that the track 32 should be a closed track and maneuver its pallet through a complete cycle corresponding to one round trip of the drive means engaging the track 32, and 360° of rotation of the pallet 31.

When resting on the table in operative position the pallet 31 and all the associated parts are supported by sliding engagement of the lower edge of the track 32 with the smooth surface of the table 10. The table 10 presents a continuous and uninterrupted surface throughout its extent except for a clearance area at 40 to permit power means below the table to extend up and engage the track 32 for feeding the work past the shaping tool 12.

THE CARRIAGE

We have illustrated a carriage arm 42 pivoted on a remote pivot at 44. Means for moving the carriage 42 toward and away from the shaping tool are provided. We have indicated an air cylinder 47 adapted to move the carriage 42 to and fro, from a withdrawn position limited by a cushioning stop 68 to a shaping position limited by abutment of the template 22 and the tool stop 18. In FIGURE 6 the carriage is in an intermediate position. To carry the weight of the carriage 42 and pivots mounted on it, the remote end at 43 overlies a track 45 fastened under the table 10.

The outer side of the track 32 is engaged by the teeth of a double pinion 50 mounted on a short arm 54 pivoted to the carriage at 56. The teeth of the pinion enter cooperating apertures 52 which extend through the face plate 36 and are continued into the wood of the track to permit the teeth to engage properly. The pinion is a twin unit comprising an upper set of teeth 50A (see FIGURE 5) and a lower set of teeth 50B. These are rigid with each other and coaxial, but the teeth 50A are offset with respect to the teeth 50B by half the pitch of the gear teeth, so that a lower row of apertures 52B receive the teeth 50B and an upper row of similar apertures 52A receive the teeth 50A of the upper pinion. Because of this offset arrangement, whenever teeth 50A are in transition from one rack tooth to the next, the teeth 50B are in the middle of their working path so that they have perfect and effective engagement at a time when teeth 50A are located at such angles that they do not carry the load very effectively. This staggered engagement permits the cheap and simple track and pinion to produce smooth and effective driving, especially when rounding curves. It will be obvious that in large machines for heavy work three or more sets of staggered teeth could be employed.

The track 32 may be detachably fastened to the pallet 31 to be disconnected and assembled with an indefinite number of different pallets; and the template 22 is detachably fastened to the pallet 31. The entire equipment can function on different jobs with no change except that each job requires its own template.

The pressure member 46 and feed drive are illustrated in active position in FIGURE 5. Active position requires only juxtaposition of the track 32 and the drive element 50, and movement of the pressure member 46 up through a clearance area in the table top 10. It will be obvious that either a solenoid or a lifting piston will be entirely effective for lifting the pressure member 46 to the position of FIGURE 5, and that withdrawal of the supporting force will let it move down to below the level of the table 10. We have illustrated an air cylinder 72.

With the pressure member 46 below the table level, the pallet and all the parts assembled on it may slide into approximate working position, with the track 36 in mesh with the pinion 50. Then raising of the pressure member 46 straddles the track, and permits the pressure member 46 to push the track toward the shaping tool 12 until the template 22 engages the stop 18, while the pinion 50 traverses the track continuously in closed cycle of movement.

Means are provided for driving the pinion 50. A feed motor 62 is mounted on the carriage 42 and connected to the pinion shaft 64 by a sprocket chain 66.

THE CARRIAGE CYCLE

The cycle of movement of the carriage and feed drive is as follows:

(1) When the cylinder 47 pushes the carriage 42 counterclockwise, the movement is cushioned when the projection 43 strikes the rod 67 of the remote dashpot 68, and stopped when the dashpot limit is reached. In this position the carriage brings the arm 54 against a stop lug 70 depending from the table 10, and continues counterclockwise far enough to separate the pressure roller 46 from engagement with the track. The pressure roller can now drop below the table level and the finished piece and its pallet can slide away to an unloading position without being lifted.

A new pallet is now slid into engagement with the pinion 50 and air cylinder 72 lifts roller 46 up inside the new track 32. Air cylinder 47 now throws the carriage 42 across in clockwise rotation until its movement is first cushioned by the near dashpot 74 and then arrested by the stop 18 engaging the template 22.

Midway of this movement the carriage engages the sensor 76 of a control switch 78, which delivers energy to the feed motor 62 and to the hold-down means of FIGURES 9, 10, and 11. Thus the workpiece is being fed along its predetermined path of traverse before the shaping tool begins to remove material from the workpiece, and the depth of cut increases gradually to full depth, without subjecting the parts to a sudden shock when the traverse feed is started *after* the shaping tool 12 has been fed into the full depth of cut.

The pattern now continues its guided cycle indefinitely, back to the initial position, and as far beyond into another cycle as it may happen to go before the operator, or some automatic instrumentality, stops it. The "overrun" is idle, in the sense that no shaping is being done, but the power load is only an idling load.

An operator, or a crew of operators, tending several machines, can set up a unit and then give attention to other duties, and if he is a minute or so late getting back to put in the next pallet, no serious waste or injury results. When the workpiece is finished, the operator merely reverses the action of air cylinder 47 and the carriage returns to remote position and releases the pallet carrying the finished workpiece.

CUSHIONING

The dashpot 74 (see FIGURE 8) has two working chambers. The oil chamber 80 has a single outlet at 82, connected by a crosstube 84 to the remote dashpot 68. The impact of the carriage on the rod 86 expels the contents of dashpot 74 through the tube 84 into dashpot 68, and the degree of retardation may be adjusted by a conventional flow-control valve 87. As such valves are old and well known, this description is not encumbered with unnecessary details. On the return stroke the same oil is expelled from dashpot 68 back into dashpot 74.

During the shaping cycle, the pattern moves the carriage to and fro repeatedly. To prevent dashpot interference during shaping we provide a biasing means for moving piston rod 86 beyond the greatest displacement needed to permit the shaping movements. The dashpot 74 is continued to define a second working chamber 88, connected at 90 to a source of compressed air.

After the template has arrested the carriage, the pressure in chamber 88 continues the withdrawal of rod 86 to a position where no portion of the to and fro carriage movements will let the carriage 42 engage the rod 86.

To avoid leakage problems, chambers 80 and 88 are closed at their adjacent ends by an oil piston 92, and an air piston 94. These pistons are fixed on the rod 86 and define a space 96 between them. If there is any leakage past either piston, the leakage will accumulate in space 96, which is vented to atmosphere by a bore 98, opening axially at one end of rod 86, and radially at 100 into space 96.

AUTOMATIC SPEED CONTROL

The useful speeds for the traverse feed of the workpiece are much greater when the pattern movement is rectilinear than the equipment can accommodate when the pattern is being moved to define a corner or a recess.

Referring again to FIGURES 3 and 4, cam control contacts are provided projecting down from the bottom of the pallet 31. A conventional rheostat or set of microswitches in the control box 98 is activated by the trailing sensor arm 100, as the cams displace it, clockwise as viewed in FIGURE 3.

For the particularly shape illustrated, four duplicate corner cams 102 may allow the motor to about ⅔ full speed while rounding the corners of the workpiece. The offset 30 has more abrupt curves at its ends, and cams 104 are set to move the arm 100 farther and reduce the speed to about ⅓ near each end of the offset.

When work schedules make it desirable to stop the machine automatically after a piece is finished, a button 106 can be set into any one of a row of holes 108, to extend out farther than the cams 104 and close a circuit breaker 110 with or without an associated signal, such as a red bull's eye 111.

The contact end 101 of the sensor 100 lies in the space between the shafts 14 and 64, to synchronize with the movements of the track 32 as the contours of the pattern are being formed by the tool 12.

HOLD-DOWN

Referring to FIGURES 9 to 14, the hold-down means proper is a cover plate 112 positioned to overlie a compound pallet adapted to receive a multiplicity of workpieces, which may be all of the same shape or of assorted shapes.

The pallet 114 on its track 32 supports the pattern 116 having contours at 118 to engage the stop 18 and determine the shapes of the workpieces 120. Each workpiece rests on bottom shims 122 parallel to the central keel 124, which is rigid with the pattern 116. A series of lateral partitions 126 define a series of compartments opening upwardly and outwardly toward the shaping tool. An adjustment cleant 128 carries two or more screw adjustments 130, which abut the keel 124 and provide precision positioning laterally. The partitions 126 carry abutment screws 132, to abut the workpiece 120 on the side toward which the shaping tool 12 pushes the workpiece.

A longitudinal cleat, or shim 134 lies on top of each workpiece 120 and receives the downward clamping thrust of the hold-down leaf 136, pivoted at 138 to the keel 124.

To complete the clamping of all the leaves 136 and the assembly below them, a downward force is required on each of the leaves. But he leaves 136 must travel horizontally as the compound pattern moves through its cycle.

Stationary pneumatic means is provided to exert downward force on the leaves 136, with substantially zero resistance to the horizontal travel of the leaves. The main cover plate 112 has a radiating labryinth of passages 140, and an inlet at 142 for admitting compressed air. A bottom cover plate 144 completes the passages 140, except at certain intersections, where an outlet fitting 146 set in the plate 144 contains a valve seat 148 and a ball valve 150. A gasket 152 affixed to the bottom of the bottom plate 144 is cut away around each ball valve 150. Because the thickness of the gasket 152 is a little less than half the downward projection of the ball 150, contact with a flat underlying surface can lift the ball and fill the surrounding chamber 154 with compressed air.

Means are provided for adjusting the height of the plate 112, so that the pressure in all the chambers 154 will push the leaves 136 down hard on the cleats 134, with a remaining clearance of only a few thousandths of an inch between the gasket 152 and the individual leaves. In this tiny crack the pressure decreases gradually until the edge is reached.

FIGURE 9 indicates two brackets 156 affixed to the plate 112, with downwardly extending arms 158, adjustably connected at 160 to sandards 162, pivoted at their lower ends at 164 to the frame of the table. Pressure cylinders 166 push these standards counterclockwise as seen in FIGURE 9, to urge the plate 112 downward.

It will be obvious that the downward force from the cylinders 166 and the upward force in the chambers 154 can be adjusted to balance with a very small leakage from the chambers 154 preventing actual rubbing contact between leaves 136 and the gasket.

Each of the leaves 136 has a curved upper side edge at 168, so that if the plate 112 is a few thousandths of an inch low, the leaf will easily slip under it.

Whenever one of the chambers 154 has no bottom, the ball 150 prevents loss of pressure. As the chamber 154 passes across the edge of one of the leaves, there will be an additional leak from that chamber for a second or so, before the ball passes the same edge, and closes the valve. The power needed in the intake 142 is much less than the power that would be required to overcome rubbing friction between the leaves and a polished metal shoe in actual surface contact with all of the leaves.

In FIGURES 9 and 10 we also indicate a substantial offset at 170. Along that side of the pallet, the operator stands to remove finished workpieces and install new ones. We have indicated by a small dotted line circle 172 and a larger dotted line circle 174, typical paths for the workpiece from pallets of various sizes.

As soon as a leaf passes out from under the hold-down plate 112 it is accessible, but because the outer edge of the leaf 136 needs to have safe clearance when passing the shaping tool 12, the leaves are a little hard to get hold of.

In FIGURE 12 we have indicated a small lifting pin 176 housed in the partition 126 and resting on a compression spring 178. This lifts the outer edge of a leaf not held down by the cover plate 112 enough to let a finger tip get under it and lift the leaf up while a new workpiece is substituted for a finished one. The raised position of the nearest leaf 136 has been indicated in dotted lines in FIGURE 13.

On some work, where the cutting load is heavy, a more drastic clamping is needed at the point where the cutting occurs. A small inset at 180, in the plate 112, at the point where the shaping tool 12 operates, leaves room for a stationary shoe 182 (see FIGURE 1) held down by more powerful means at 184 independent of the leaf load obtaining under the plate 112, to load the leaf 136 more heavily at the time maximum clamping action is needed. It will be obvious that the use of the extra pressure at the point of cut is optional.

Figure 14:
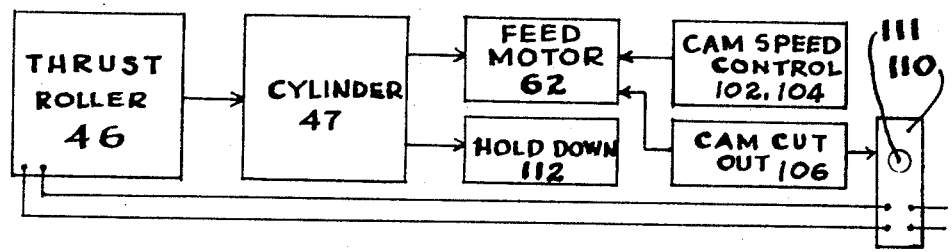
FIGURE 14 is a block plan diagram indicating the relationship between the principal functional subcombinations.
Figure 13:
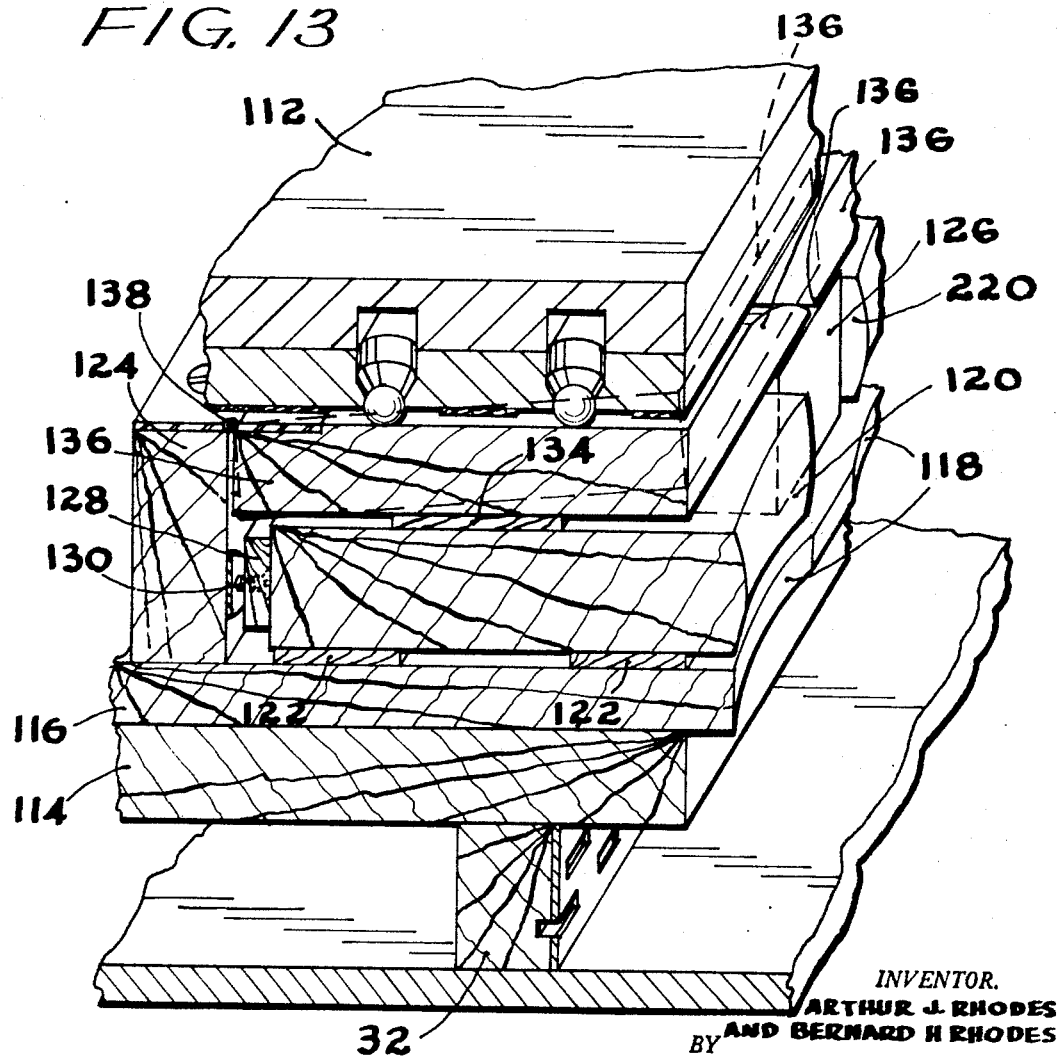
FIGURE 13 is a large scale fragmentary view of a multiple pallet.

It will be obvious that any of the instrumentalities illustrated as air cylinder, or hydraulic cylinders, or springs, can be activated by liquid, gas, or spring tension, the selection being a matter only of choice or convenience. In FIGURE 14 we have indicated the instrumentalities in block diagram as a convenience to searchers. The thrust roller 46 moves up and renders the cylinder 47 active to move the new pallet across to the cutting tool. En route, this energizes both the hold-down 112 and the feed motor 62. As cutting proceeds, the cam speed control 102, 104 varies the feed motor speed. If a cutout is desired the button cam 106 activates the circuit breaker 110 at the appropriate time.

Others may readily adapt the invention for use under various conditions of service by employing one or more of the novel features disclosed, or equivalents thereof.

As at present advised, with respect to the apparent scope of the invention, we desire to claim the following subject matter:

1. Automatic shaping equipment comprising, in combination: a table; a power-driven shaping tool mounted to project above said table; a pallet adapted to carry a workpiece, and slideable on said table; said pallet having a downwardly extending flange defining a closed track; power-driven guiding and feeding means below said pallet; said guiding and feeding means including a presure element adapted to engage said track; a feeding element adapted to engage said track and clamp said track between itself and said pressure element, and traverse said track through a complete cycle of sliding movement on said table; means for adjusting said pressure element from a lower level below said table, in inoperative position, to an upper level with said track between it and said feeding element; means to press said pressure element against said flange and toward said feeding element and said shaping tool; whereby lowering of said pressure element to inoperative position leaves said table free and unobstructed to permit sliding removal of a pallet carrying a finished workpiece and sliding substitution of a pallet carrying an unfinished workpiece.

2. Equipment according to claim 1 in which a fixed abutment stop is provided adjacent said shaping tool, to limit advance of a pallet and workpiece toward said shaping tool; said pallet carrying a pattern having a periphery shaped to define a corresponding shape for the finished workpiece; said pattern and abutment stop being at a level close to, but vertically offset from, said shaping tool.

3. Equipment according to claim 2 in which said table is shaped to leave a clearance area for the movement of said pressure and feeding elements toward and away from said shaping tool.

4. Equipment according to claim 3 in which an operator's control means is provided for moving said pressure element up into operative position above said table, in engagement with the track of said pallet.

5. Equipment according to claim 4 in which automatic means is provided for pressing said pressure element and the pallet engaged thereby toward and into shaping engagement with said shaping tool.

6. Equipment according to claim 5 in which automatic means is provided for feeding said track and its pallet through a complete closed shaping cycle.

7. Equipment according to claim 6 in which an automatic connection between said pressure element and said feeding element is arranged to start said feeding element before said approaching workpiece reaches shaping position.

8. Equipment according to claim 3 in which said pallet is shaped to receive a workpiece by bottom and side contact, leaving one side exposed to said shaping tool; and a top face facing upwardly; and hold-down means for exerting downward force on said exposed top face, to clamp said workpiece firmly during the shaping operation.

9. Equipment according to claim 8 in which said hold-down means is a relatively stationary element overlying, or covering, at least a portion of the path of feeding movement of said workpiece; said covered portion extending past the point of shaping engagement with said shaping tool and beyond said point in both directions.

10. Equipment according to claim 9 in which said hold-down means defines a multiplicity of downwardly open recesses; each recess being encircled by a plane area defining the periphery of said recess; and connections for delivering compressed air into all said recesses; said pallet and its asembled workpiece presenting an upwardly facing flat surface spaced from said plane encircling areas by a clearance having a vertical dimension many times less than the depth of said recess; whereby leakage of pressure fluid out between said hold-down means and the hold-down workpiece and pallet is slow enough to maintain an operative fraction of the pressure delivered to said recesses, effective to press downwardly, without frictional rubbing contact between said stationary hold-down means and said moving pallet and workpiece.

11. Equipment according to claim 10 in which said pallet is shaped to receive a plurality of workpieces arranged to move past said shaping tool one after the other; each assembled workpiece being provided with a separate individual pressure plate above it to receive the fluid clamping pressure of said hold-down means.

12. Equipment according to claim 11 in which said hold-down means covers only a portion of the complete path of each workpiece, leaving a substantial portion of said path remote from said shaping tool exposed to permit removal of finished workpieces and insertion of unfinished workpieces without removing said pallet and without discontinuing the feeding traverse.

13. Equipment according to claim 3 in which moveable carriage means supports said pressure and feed elements; said carriage means being guided in a predetermined path from a remote position up into shaping position with a workpiece engaging said shaping tool.

14. Equipment according to claim 13 in which power means is provided for yieldingly holding said carriage means in either extreme position; and for reciprocating it from each extreme position to the other.

15. Equipment according to claim 14 in which a first dashpot cushioning means is provided for cushioning the carriage movement toward its shaping position.

16. Equipment according to claim 15 in which automatic means is provided for withdrawing said first dashpot cushioning means, throughout the shaping operation, to a position beyond the nearest approach of said pallet permitted by said pattern and abutment stop.

17. Equipment according to claim 15 in which a second dashpot cushioning means is provided for cushioning the movement of said carriage means to its remote position.

18. Equipment according to claim 17 in which both dashpot means are hydraulic; and a fluid passage connection between said first and second dashpot means, permitting restricted flow in either direction; whereby activation of either dashpot expels the contents thereof into the other dashpot and thus conditions the other dashpot for its next operation.

19. Equipment according to claim 1 in which said feeding means comprises rack teeth formed in the side of said track, and a drive pinion for engaging said rack teeth; said pinion having a plurality of sets of drive teeth; said sets being axially spaced apart and rotationally offset to subdivide the rotational space between successive teeth into a plurality of lesser spaces; each lesser space being an aliquot portion of the larger space; said rack teeth being correspondingly offset; said track being non-circular and including portions of relatively great convexity.

References Cited

UNITED STATES PATENTS

| | | | |
|---|---|---|---|
| 1,337,695 | 4/1920 | Emery | 144—145.1 |
| 1,567,865 | 12/1925 | Sawyer | 144—145.1 |
| 2,141,631 | 12/1938 | Whitney et al. | 144—145.1 |
| 2,934,107 | 4/1960 | Hawkins | 144—145 X |
| 3,014,510 | 12/1961 | Hawkins | 144—145 X |

ANDREW R. JUHASZ, *Primary Examiner.*

G. WEIDENFELD, *Assistant Examiner.*

U.S. Cl. X.R.

144—145